June 26, 1923.  W. G. COX  1,460,343
FENDER
Filed Feb. 3, 1923   2 Sheets-Sheet 1
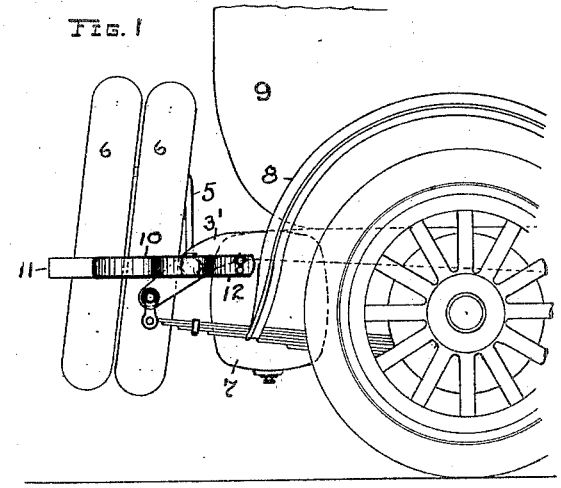
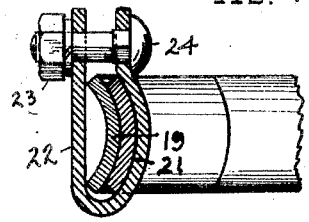
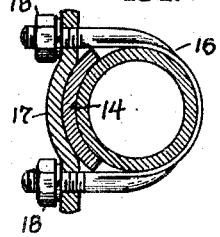
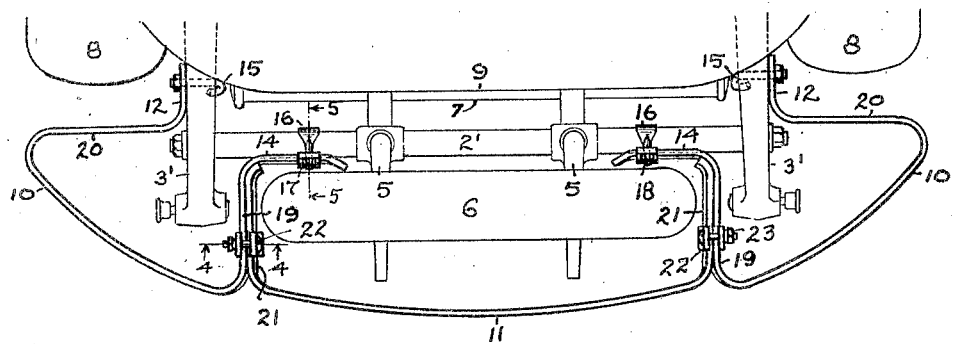
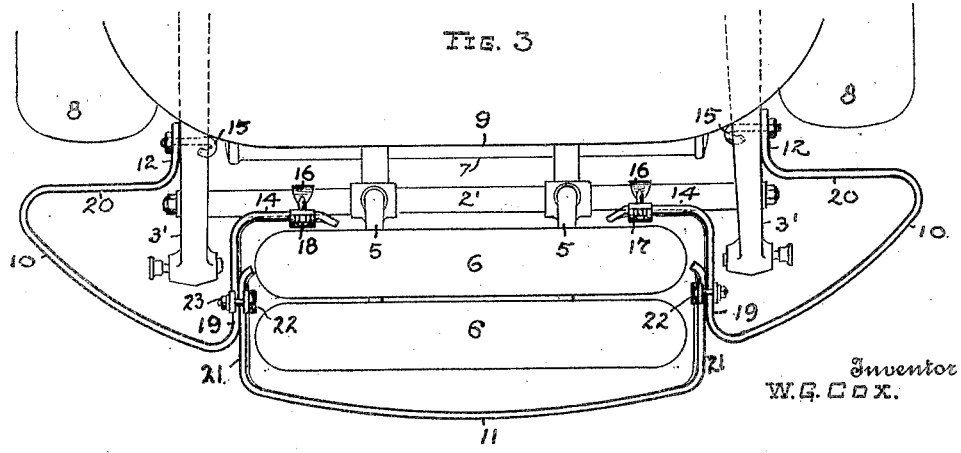
Inventor
W. G. COX.
By Fisher, Moser & Moore
Attorney

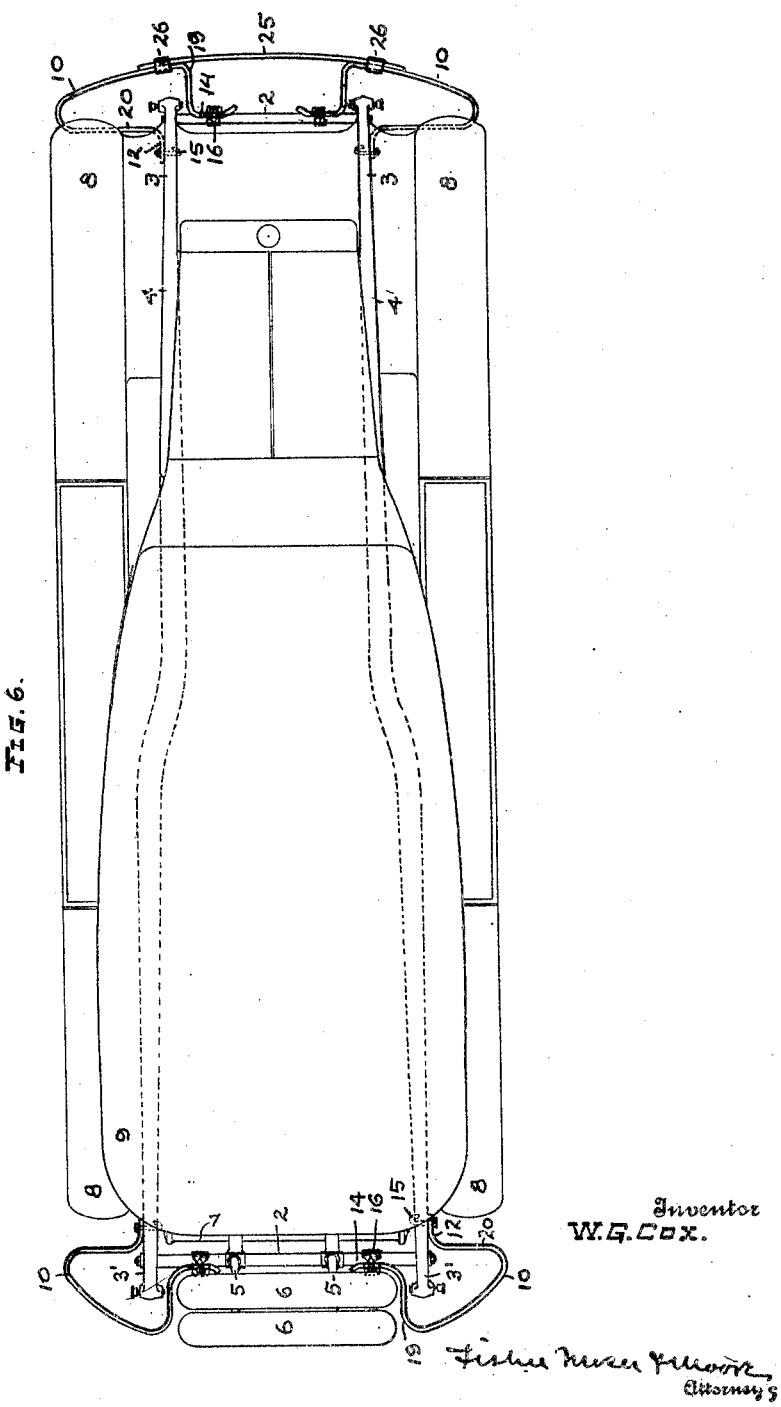

Patented June 26, 1923.

1,460,343

UNITED STATES PATENT OFFICE.

WILLIAM G. COX, OF CLEVELAND, OHIO.

FENDER.

Application filed February 3, 1923. Serial No. 616,740.

*To all whom it may concern:*

Be it known that I, WILLIAM G. Cox, a citizen of the United States, residing at Cleveland, in the county of Cuyahoga and State of Ohio, have invented certain new and useful Improvements in Fenders, of which the following is a specification.

My invention relates to an improvement in fenders, and in devising and constructing this fender I have had the following objects in view; first, to cushion shocks and ward off harm at the ends of an automobile; second, to protect the mud guards or wheel fenders from glancing blows; third, to permit facile attachment of separate fender sections to the ends of a chassis frame embodying transverse cross bars; fourth, to permit convenient attachment of the fender sections to the frame in the presence of tire carriers and spare wheels and rims; fifth, to enable adjustment and setting of a mid-section of the fender variably in respect to a tire carrier and one or more tires, wheels or rims projecting different distances rearwardly from the frame; and sixth, to permit a mid-section of the fender to be readily shifted to provide ample room in removing and replacing the extra wheel or tires, without disconnecting the sections.

In the accompanying drawings, Fig. 1 is a side view of the rear end of an automobile equipped with my fender, and Fig. 2 is a top view of the same parts, showing a single spare tire in place and the fender contracted. Fig. 3 is a view similar to Fig. 2 showing the fender extended to enclose two spare tires. Fig. 4 is an enlarged view in cross section of the fender on line 4—4 of Fig. 2. Fig. 5 is an enlarged view in cross section of the fender and a cross bar of the frame on line 5—5 of Fig. 2. Fig. 6 is a reduced top view of an automobile with fenders attached to the side and end bars of the frame opposite each mud guard.

In certain types of automobiles the chassis frame comprises round tubular cross bars 2—2' at each end fixed between the curved or downwardly-extending extremities 3—3' of the longitudinal side members or bars 4—4'. Arms 5 or other suitable carriers are also provided for the rear cross bar 2' upon which one or more extra wheels, rims or spare tires 6 are removably secured. A gasoline tank 7 is usually suspended between the side members 4—4' of the chassis frame, and curved mud-guards 8 for the wheels project downwardly outside of the vehicle body 9 and the curved extremities 3—3' of side members 4—4'. The spare tires 6, when in place, occupy a central projecting position at the rear of the body, thus affording a measure of protection from bumps and collisions coming directly in line therewith, but the impacting part may cut or injure the spare tire or wheel. Injury to both the car and its attached accessories may be avoided to a large extent by mounting end guards or fenders upon the car frame, which in the present instance comprise a pair of separate end fender sections 10, and an intermediate or mid-section 11. Referring to Figs. 1 to 5, inclusive, each end section 10 consists of a flat metal bar which is bent into a substantially quadrant shape intermediate its extremities 12 and 14. These extremities are relatively short and straight and provide spaced supporting feet extending at right angles to each other and in the present instance one is longer than the other. The shorter foot or extremity 12 is flat to permit it to be clamped immovably against the outer flat face or web of the side bar or channel member 4 or 4', using a hook bolt 15 or any other suitable attachment device, while the opposite longer foot or extremity 14 is curved in cross section, or concavo-convex, to fit the round cross bar or tube 2 or 2' and to permit a yoke-shaped clip or bolt 16, a curved plate 17 and nuts 18 to be employed in clamping this foot or extremity rigidly upon the cross bar or tube. The arc portion of each quadrant-shaped section 10 is connected to the longer extremity 14 by a straight leg portion 19 of substantial length which extends parallel with the short straight foot 12 and therefore also parallel with the longitudinal side members of the frame. When this fender section is fastened to the side member and cross bar as stated, leg 19 is interposed between the frame end 3' and the tire 6, and the other leg or connecting portion 20 extends at right angles to the longitudinal side member directly opposite the mud guard or wheel fender 8 which this fender section is especially intended to protect. This protecting position is well exemplified in Fig. 6 at the rear end of the automobile delineated therein, the mid-section 11 of the fender being purposely omitted to show the central placement of the spare tires 6 and the slanting fending positions of the arc portions of the fender sections 10 in the corner spaces between the tires and the mud guards.

Now referring to Figs. 2 and 4, it should be noted that the two legs 19 of the pair of end sections lie in the same horizontal plane and extend parallel with each other when both end sections are secured to a common cross bar or tube 2', and that each leg 19 is curved in cross section, or concavo-convex. The middle section 11 shown in Fig. 2 is also provided with straight extremities or legs 21—21 bent at substantially right angles to the main impact portion thereof which may be curved or straight, and these legs 21 are also curved, or concavo-convex, in cross section to seat within the concaved sides of the two legs 19 of the respective end sections 10 so that a sliding and guiding fit and connection is obtained which will permit the mid-section to be drawn out or pushed in within limits. A spring clip 22 having one straight leg and one curved leg, embraces each pair of nested legs 19 and 21, and a nut 23 and bolt 24 may be used to contract the clip and bind the parts immovably together in any set or adjusted position. Thus in Fig. 2 I show a single spare tire mounted upon the carrier, with the middle fender section 11 in a retired position within and between the end sections 10, and in Fig. 3, the same mid-section is withdrawn or extended part way to enclose two spare tires. A further outward movement of the mid-section may also be effected to provide adequate room and clearance in removing or replacing the spare tires from the carrier posts or arms 5.

The end fender sections 10 may be used with or without the middle fender section 11, but when all three sections are used together the tires will be protected as well as the mud guards and the end sections will be rigidly connected and firmly braced against lateral movements and side thrusts. This same assembly may be used at the front end of an automobile, but as an alternative I may use a partial substitute for the middle section 11 having legs 21 and employ instead a single plate or bar 25 fastened at its opposite ends to the end sections 10 by clamps 26, see Fig. 6.

What I claim, is:

1. An automobile having mud guards for the wheels thereof, and fenders of quadrant shape each having spaced extremities separately affixed at the outer sides of the side bars and to a cross bar respectively, of the automobile athwart the ends of said guards.

2. An automobile having a chassis frame and wheel guards outside of said frame, separate fenders for said wheel guards made of bars bent at their extremities at right angles to each other and means securing each right angled extremity of a fender detachably to said frame with the intermediate portion of the fender lying substantially wholly outside the frame athwart the end of a wheel guard.

3. An automobile having longitudinal and cross-connecting frame members, mud guards for the wheels contiguous to outside of said frame members, and fenders for said mud guards fixed to said longitudinal and cross-connecting members.

4. An automobile having parallel longitudinal side members and transverse bars connecting corresponding ends of said members, mud guards for the wheels outside of said side members, fenders for said mud guards made of bars bent angularly at their opposite extremities to permit their attachment to said side members and transverse connecting bars, and means detachably uniting said extremities to said members and bars.

5. An automobile having chassis frame side members and a cross bar between said members, wheel guards at opposite sides of said chassis frame, a fender bar for each wheel guard having an arc-shaped fending portion extending opposite thereto and extremities bent at right angles to each other and spaced apart to permit separate engagement with a side member and the cross bar, and separate fastening devices for each fender extremity.

6. A fender for the end of an automobile, comprising a pair of end sections of triangular quadrant shape each having two straight legs at right angles adapted to be attached to the automobile and connected by a curved buffer portion, and a middle impact section detachably united with the corresponding legs of said end sections.

7. A fender for the end of an automobile, comprising triangular end sections having right-angled extremities adapted to be attached to the side and cross bars respectively of the frame of the automobile, and a middle impact section united at its opposite ends to said end sections.

8. An end fender for an automobile, comprising a pair of end sections made of bars bent into a substantially triangular figure with attachment extremities extending at right angles to each other, and a middle section connected at its opposite ends with said end sections.

9. An end fender for an automobile, comprising a pair of end sections and an extensible middle section slidably connected thereto and shiftable back and forth uniformly at both ends in respect to the end of the automobile.

10. An end fender for an automobile, comprising end sections and a middle section slidably connected therewith and adapted to be withdrawn and retired in respect thereto.

11. An end fender for an automobile, comprising a pair of end sections and midsection having corresponding leg portions slidably engaged with each other to permit the mid-section to be displaced or retired in respect to the end sections.

12. An automobile fender comprising a pair of end sections and an extensible mid-section having concavo-convex leg portions slidably engaged with each other to permit forward and rearward movements of the mid-section relatively to the end sections.

13. An automobile fender, comprising a pair of end sections each having an arc-shaped impact portion and angularly-related leg portions terminating in attachment extremities bent at right angles to each other, and a middle impact section connected with said end sections.

14. An automobile fender, comprising a pair of end sections having corresponding leg portions parallelly-related and terminating in attachment extremities, a middle section having parallel leg portions engaging the corresponding leg portions of said end sections, and clamping devices for said leg portions.

15. An automobile fender, comprising a flat bar bent into quadrant shape and having its opposite ends bent at right angles to each other, and clamping devices associated with said ends adapted to permit attachment thereof to the longitudinal and transverse members of the automobile.

16. A rear fender for an automobile comprising sections on each side opposite the respective mud-guards, and an intermediate section embracing the spare tire and supported from a cross bar back of the tire and joining the two side bars of the chassis.

17. A rear fender for an automobile comprising sections on each side opposite the respective mud-guards, and an intermediate section embracing the spare tire with side members between the tire and the side bars of the chassis, said side members having an adjustable connection with parts mounted on a cross bar between said chassis side bars outside of the tire-supports secured to the same cross bar.

18. A rear fender for an automobile embracing the spare tire and mounted on a cross bar joining the chassis side bars back of the tire and secured thereto at points outside of the spare-tire supports on the same cross bar.

In testimony whereof, I affix my signature hereto.

WILLIAM G. COX.